US010867097B2

(12) United States Patent
Iverson

(10) Patent No.: US 10,867,097 B2
(45) Date of Patent: Dec. 15, 2020

(54) ELMORE DELAY TIME (EDT)-BASED RESISTANCE MODEL

(71) Applicant: Synopsys, Inc., Mountain View, CA (US)

(72) Inventor: Ralph Benhart Iverson, Arlington, MA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 16/568,984

(22) Filed: Sep. 12, 2019

(65) Prior Publication Data
US 2020/0089830 A1 Mar. 19, 2020

Related U.S. Application Data

(60) Provisional application No. 62/731,147, filed on Sep. 14, 2018, provisional application No. 62/733,317, filed on Sep. 19, 2018.

(51) Int. Cl.
G06F 30/367 (2020.01)
G06F 16/28 (2019.01)
(Continued)

(52) U.S. Cl.
CPC .......... G06F 30/367 (2020.01); G06F 16/283 (2019.01); G06F 30/3312 (2020.01);
(Continued)

(58) Field of Classification Search
CPC ............... G06F 16/283; G06F 17/5031; G06F 17/5036; G06F 17/5068; G06F 2119/12;
(Continued)

(56) References Cited

U.S. PATENT DOCUMENTS 5,703,798 A * 12/1997 Dhar ...................... G06F 30/33
703/14
5,875,114 A * 2/1999 Kagatani ................ G06F 30/33
716/113
(Continued)

FOREIGN PATENT DOCUMENTS

KR 10-2018-0025210 A 3/2018

OTHER PUBLICATIONS

Yun et al.; "Thermal component model for electrothermal analysis of IGBT module systems"; IEEE Transactions on Advanced Packaging; vol. 24, Issue: 3; Journal Article; Publisher: IEEE (Year: 2001).*

(Continued)

Primary Examiner — Helen Rossoshek
(74) Attorney, Agent, or Firm — Haynes Beffel & Wolfeld, LLP; Andrew L. Dunlap; Sikander Khan

(57) ABSTRACT

We disclose an integrated circuit design tool for modeling resistance of a terminal of a transistor such as a gate, a source, a drain, and a via. A structure of the terminal is specified in a data structure in memory using a three-dimensional (3D) coordinate system. For each of a plurality of volume elements in the specified structure, an Elmore delay time (EDT) is determined. For those volume elements in the plurality of volume elements that are located on a surface of the gate terminal which faces the channel region, an average EDT (aEDT) is determined based on the EDT. Point-to-point resistance values of the terminal are generated as a function of the aEDT and a capacitance of the terminal.

20 Claims, 9 Drawing Sheets

(51) Int. Cl.
  *G06F 30/39* (2020.01)
  *G06F 30/3312* (2020.01)
  *G06F 119/12* (2020.01)
  *G06F 30/398* (2020.01)
(52) U.S. Cl.
  CPC ............ *G06F 30/39* (2020.01); *G06F 30/398* (2020.01); *G06F 2119/12* (2020.01)
(58) Field of Classification Search
  CPC ............ G06F 2217/84; G06F 30/3312; G06F 30/367; G06F 30/39; G06F 30/398; H03K 19/096
  See application file for complete search history.

(56) References Cited

U.S. PATENT DOCUMENTS

| | | | | |
|---|---|---|---|---|
| 6,311,313 | B1* | 10/2001 | Camporese | G06F 1/10 716/113 |
| 6,606,587 | B1* | 8/2003 | Nassif | G06F 30/33 703/14 |
| 6,880,141 | B1 | 4/2005 | Tetelbaum | |
| 6,915,361 | B2* | 7/2005 | Alpert | G06F 30/394 710/52 |
| 7,484,199 | B2* | 1/2009 | Alpert | G06F 30/18 716/129 |
| 7,721,236 | B2* | 5/2010 | Hwang | G06F 30/3312 716/113 |
| 7,921,393 | B2* | 4/2011 | Furnish | G06F 30/394 716/110 |
| 7,970,590 | B1 | 6/2011 | Burks | |
| 8,020,129 | B2* | 9/2011 | Abbaspour | G06F 30/3312 716/113 |
| 8,146,045 | B1* | 3/2012 | Tuan | G06F 30/34 716/132 |
| 8,276,107 | B2* | 9/2012 | Durbha | G06F 30/30 716/104 |
| 8,479,131 | B2 | 7/2013 | Dewey, III et al. | |
| 8,572,544 | B2* | 10/2013 | Durbha | G06F 30/39 716/133 |
| 8,799,839 | B1* | 8/2014 | Tetelbaum | G06F 30/3312 716/108 |
| 8,826,217 | B2* | 9/2014 | Mottaez | G06F 30/00 716/132 |
| 8,826,218 | B2* | 9/2014 | Mottaez | G06F 30/367 716/132 |
| 8,930,862 | B2* | 1/2015 | Dally | H03K 19/096 716/103 |
| 9,552,454 | B2* | 1/2017 | Chowdhury | G06F 30/398 |
| 10,489,539 | B2* | 11/2019 | Iverson | G06F 30/367 |
| 2004/0128637 | A1 | 7/2004 | Teene | |
| 2006/0107246 | A1* | 5/2006 | Nakamura | G06F 30/36 716/113 |
| 2012/0226456 | A1 | 9/2012 | Lu | |
| 2014/0007037 | A1 | 1/2014 | Mottaez et al. | |
| 2014/0033162 | A1* | 1/2014 | Iyer | G06F 30/367 716/135 |
| 2017/0201244 | A1* | 7/2017 | Kerr | H04B 3/548 |
| 2017/0357286 | A1 | 12/2017 | Liu et al. | |
| 2018/0089353 | A1 | 3/2018 | Iverson | |
| 2018/0239857 | A1 | 8/2018 | Qin et al. | |

OTHER PUBLICATIONS

Ivanova et al.; Development of mathematical models for standard cells timing analysis at the 28 nm technology and below: 2017 IEEE Conference of Russian Young Researchers in Electrical and Electronic Engineering; Conference Paper; Publisher: IEEE (Year: 2017).*
Kar et al.; "Accurate estimation of on-chip global RLC interconnect delay for step input"; 2010 International Conference on Computer and Communication Technology (ICCCT); Conference Paper; Publisher: IEEE (Year: 2010).*
PCT/US2019/050883—International Search Report and Written Opinion dated Jan. 3, 2020, 10 pages.

* cited by examiner

ELMORE DELAY TIME (EDT)-BASED RESISTANCE MODEL

PRIORITY APPLICATION

This application claims the benefit of U.S. Provisional Patent Application No. 62/731,147 filed 14 Sep. 2018 and of U.S. Provisional Patent Application No. 62/733,317 filed 19 Sep. 2018; which are incorporated herein by reference.

FIELD OF THE TECHNOLOGY DISCLOSED

The technology disclosed relates to the modeling of integrated circuit devices in computer-aided design (CAD) and electronic design automation (EDA) systems, and more specifically to modeling and simulating conductors in an integrated circuit (IC).

BACKGROUND

An integrated circuit (IC) is a set of electronic circuits that integrates a large number of semiconducting transistors into a small chip. Among the most advanced integrated circuits are microprocessors, memory chips, programmable logic sensors, power management circuits, etc. Advances in IC technology have led to size reduction of transistors, enabling greater densities of devices and circuits in IC chips and enhanced performance.

A computer simulation is a simulation, run on a single computer, or a network of computers, to reproduce behavior of a physical system. The simulation applies an abstract model to simulate the system. Computer simulations have become a useful part of mathematical modeling of many natural systems in physics (computational physics), electronics, chemistry, and engineering. Simulation of a system is represented as the computer execution of the system's model. Computer simulation may be used to explore and gain insights into new technology and to estimate the performance or other behaviors of complex systems.

"Rg/3" refers to a noise-based resistor network model of a transistor's gate. The Rg/3 model was first presented in the literature as a "noise" model, because it is a configuration that generates the same amount of "noise" in the gold (distributed) model as it does lumped-element model used to represent the gate of a transistor for circuit analysis.

Rg/3-like models are based on planar transistors and not readily adapted to more complex structures such as 2D and 3D transistor structures (e.g., FinFet, GAA (Gate All-Around), and CFET (stacked CMOS). Resistance models that use traditional 1D current flow are not accurate for these complex structures.

An opportunity arises to model resistance based on Elmore Delay Time (EDT) and improve accuracy of simulation tools.

SUMMARY

Roughly described, a system and a method are provided that can model resistance of a gate terminal of a transistor. The transistor has at least one channel region. A structure of the gate terminal is specified in a data structure in memory using a three-dimensional (3D) coordinate system. For each of a plurality of volume elements in the specified structure, an Elmore delay time (EDT) is determined and stored in a database in the memory. In one embodiment, the EDT is determined by solving a Laplace's equation with a Neumann boundary condition. The Laplace's equation is of a form $t_{ELMORE} = G^{-1} * C_{TOT}$, where $t_{ELMORE}$ is a vector of the EDT of each of the plurality of volume elements, G is a conductance matrix, and $C_{TOT}$ is a vector of total capacitance at each of the plurality of volume elements. The Neumann boundary condition is constant for the volume elements in the plurality of volume elements that are located on the surface of the gate terminal which faces the channel region.

For those volume elements in the plurality of volume elements that are located on a surface of the gate terminal which faces the channel region, an average EDT (aEDT) is determined based on the EDT and stored in the database in the memory.

A program of instructions is executed to generate point-to-point resistance values of the gate terminal as a function of the aEDT and a capacitance of the gate terminal. In one embodiment, the point-to-point resistance values of the gate terminal are generated as a function of dividing the aEDT by the capacitance of the gate terminal.

In one embodiment, point-to-point resistance values of a parasitic-capacitance node of the gate terminal are generated by (i) determining an average EDT (aEDT) based on the EDT for those volume elements in the plurality of volume elements that are located on a surface of the gate terminal which does not face the channel region and (ii) executing a program of instructions to generate the point-to-point resistance values of the parasitic-capacitance node of the gate terminal as a function of the aEDT and a capacitance of the gate terminal.

In one embodiment, the point-to-point resistance values of the parasitic-capacitance node of the gate terminal are generated as a function of dividing the aEDT by the capacitance of the gate terminal.

In one embodiment, the transistor has at least one source terminal. In such an embodiment, resistance of the source terminal of the transistor is modeled by (i) specifying a structure of the source terminal in a data structure in the memory using the 3D coordinate system, (ii) for each of a plurality of volume elements in the specified structure, determining an Elmore delay time (EDT) and storing the EDT in the database in the memory, (iii) for those volume elements in the plurality of volume elements that are located on a surface of the source terminal which faces the channel region, determining an average EDT (aEDT) based on the EDT and storing the aEDT in the database in the memory, and (iv) executing a program of instructions to generate point-to-point resistance values of the source terminal as a function of the aEDT and a capacitance of the source terminal.

In one embodiment, the point-to-point resistance values of the source terminal are generated as a function of dividing the aEDT by the capacitance of the source terminal.

In one embodiment, the transistor has at least one drain terminal. In such an embodiment, resistance of the drain terminal of the transistor is modeled by (i) specifying a structure of the drain terminal in a data structure in the memory using the 3D coordinate system, (ii) for each of a plurality of volume elements in the specified structure, determining an Elmore delay time (EDT) and storing the EDT in the database in the memory, (iii) for those volume elements in the plurality of volume elements that are located on a surface of the drain terminal which faces the channel region, determining an average EDT (aEDT) based on the EDT and storing the aEDT in the database in the memory, and (iv) executing a program of instructions to generate point-to-point resistance values of the drain terminal as a function of the aEDT and a capacitance of the drain terminal.

In one embodiment, the point-to-point resistance values of the drain terminal are generated as a function of dividing the aEDT by the capacitance of the drain terminal.

In some embodiments, the aEDT is directly determined using a random walk approach without determining the EDT.

In one embodiment, a resistor network model for the transistor is computed based on the point-to-point resistance values of the gate terminal, the source terminal, and the drain terminal. In one embodiment, the resistor network model is utilized for parasitic extraction and timing verification in electronic design of an integrated circuit.

In one embodiment, the transistor is a metal-oxide-semiconductor field-effect transistor (MOSFET). In another embodiment, the transistor is a fin field effect transistor (FinFet). In yet another embodiment, the transistor is a gate all-around (GAA) transistor.

In one embodiment, the transistor is a complementary field effect transistor (CFET) having at least a first gate terminal and a second gate terminal. Resistance of the first and second gate terminals is modeled by (i) specifying a first structure of the first gate terminal in the data structure in the memory using the 3D coordinate system and specifying a second structure of the second gate terminal in the data structure in the memory using the 3D coordinate system, (ii) for each of a first plurality of volume elements in the specified first structure, determining a first Elmore delay time (EDT) and storing the first EDT in the database in the memory, and for each of a second plurality of volume elements in the specified second structure, determining a second EDT and storing the second EDT in the database in the memory, (iii) for those volume elements in the first and second pluralities of volume elements that are located on respective surfaces of the first and second gate terminals which face respective channel regions of the first and second gate terminals, determining an average EDT (aEDT) based on the EDT and storing the aEDT in the database in the memory, and (iv) executing a program of instructions to generate point-to-point resistance values of the gate terminal as a function of the aEDT and a capacitance of the gate terminal.

One or more embodiments of the invention or elements thereof can be implemented in the form of a computer product including a non-transitory computer readable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

These and other features, aspects, and advantages of the invention will become apparent from the following detailed description of illustrative embodiments thereof, which is to be read in connection with the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The color drawings also may be available in PAIR via the Supplemental Content tab.

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DETAILED DESCRIPTION

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

Introduction

We propose a novel 2D/3D field solver that generates resistor values which account for the 2D and 3D transistor topologies. This field solver is based on the Elmore Delay Time (EDT), which is consistent with the Rg/3 approach.

Regarding EDT, the Elmore delay at a node of a resistor-capacitor (RC) network is the first-order delay time from an (effective) driver to that node and is generally a reasonable estimate of delay time in the simulated circuit. For an input that is a slow ramp, the output will be a slow ramp delayed by the Elmore delay time. For an input that is an impulse, the output will be a pulse with a centroid delayed by the Elmore delay time.

For the planar-MOSFET "Rg/3" resistance, the EDT to the gate is the same as the averaged EDT above the channel region in the fully distributed model. The proposed point-to-point resistance calculator is a 2D/3D field solver designed to find a Rg/N resistance to the gate, and applicable to non-planar devices such as FinFet, GAA, and CFET. While EDT can be calculated for a discrete RC network, the disclosed calculator finds the EDT associated with a continuous resistive 2D or 3D environment, allowing us to find the average EDT at the channel region of a (distributed) device, and the required resistor value to realize that EDT in a discrete RC network. This calculator can be part of a standalone field solver and/or an application programming interface (API) that can be integrated into other tools.

In one embodiment, for each pair of the volume elements, the average EDT is determined from one element with respect to the other. That is, one volume element in the pair is treated as a driver where EDT is assumed to be zero and the average EDT is determined for the second volume element in the pair.

Figure 3:
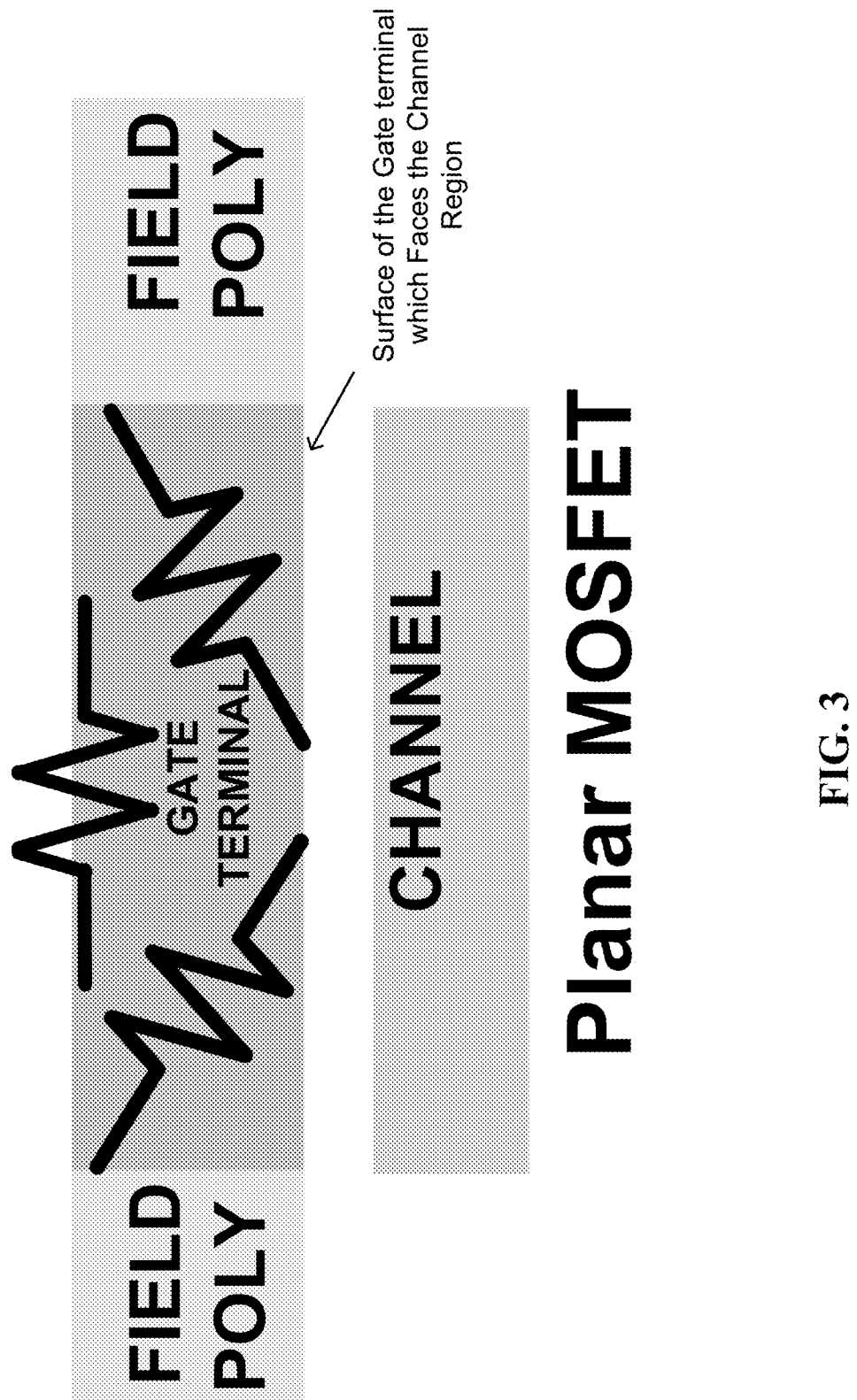
FIG. 3 shows an example planar MOSFET transistor. The technology disclosed can be used model resistance of a gate terminal, a source terminal, and a drain terminal of the planar MOSFET transistor. The three resistors indicate one representation of an Rg/3 model.

To realize a 2D/3D implementation, consider EDT in a discrete RC network that is a tree (no loops) emanating from a driver node, as the one shown in FIG. 3. All EDTs are relative to that driver node. To find the EDT at a node in the tree, first find the EDT associated with each resistor in that tree by multiplying the resistor value by the "downhill" capacitance (capacitance away from the driver). Then, total the resistor-delay values for the series of resistors that connect the node of interest to the driver.

Figure 7:
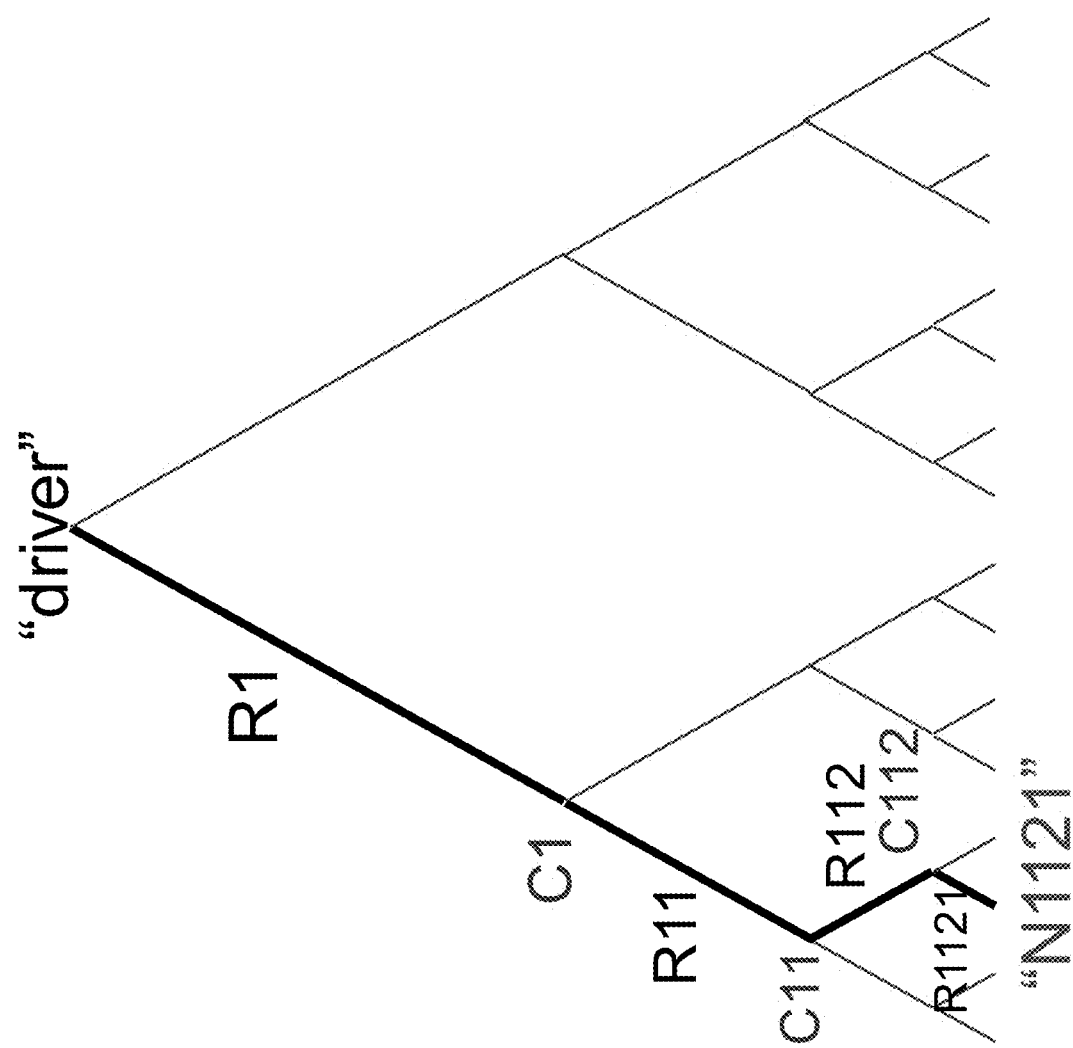
FIG. 7 shows one embodiment of determining the Elmore Delay Time (EDT) in a tree resistive structure such as the gate of a transistor.

In FIG. 7, the EDT for N1121 is the sum of:

$R1*(C1+C11+C12+C111+C112+C121+C122+<8$ caps on the right>)

$R11*(C11+C111+C112+<4$ lowest level caps>)

$R112*(C112+C1121+C1122)$ $R1121*(C1121)$

In a general mesh, the EDT relative to a driver node is found by solving the matrix equation:

$$t_{ELMORE} = G^{-1} * C_{TOT},$$

where $t_{ELMORE}$ is a vector of the Elmore delay times at each node, G is the conductance matrix (no row or column for the driver), and $C_{TOT}$ is a vector of the total capacitance at each node.

When the resistance network is a simple tree (no loops), this is equivalent to the "tree" formulation of the calculation done for FIG. 7.

Figure 8:
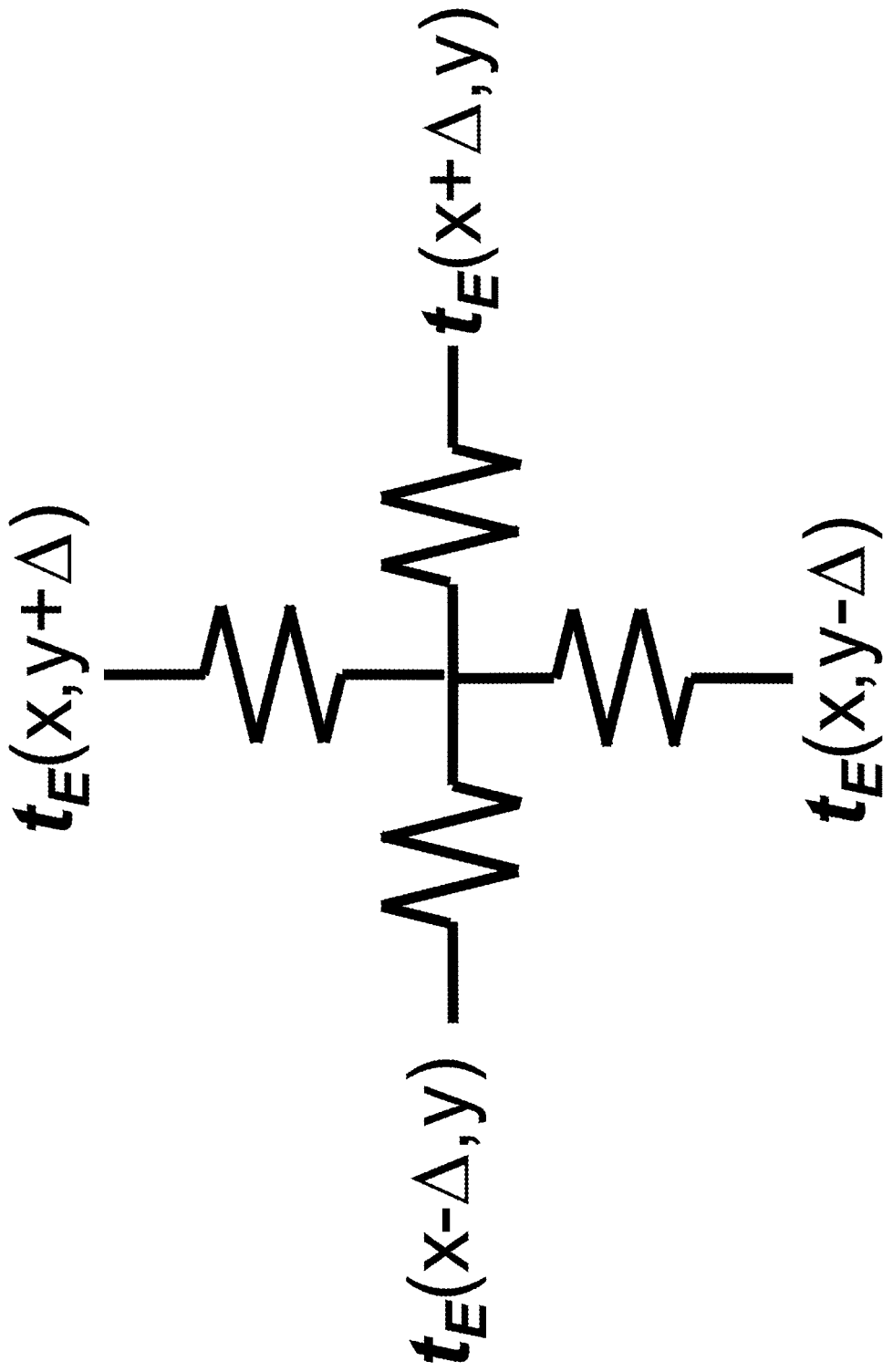
FIG. 8 shows one embodiment of determining the EDT in a continuous resistive structure such as the gate of a transistor.

To recognize the EDT solution in a continuous resistive structure such as the gate of a transistor, turn to FIG. 8 and consider the EDT at a grid-based node (x,y) connected to four other nodes, each a distance of $\Delta$ from (x,y).

The EDT at (x,y) is the average of the other four Elmore delays, plus $Rsh*CperArea*\Delta^2/4$, or in mathematical terms:

$$\nabla^2 t_E = -Rsh*CperArea$$

The random-walk approach is suited for solving this problem. As applied to EDT, the right-hand (source) term is non-zero only at the surface of the gate where it faces the channel region. The random-walk solution for the EDT at a point starts at that point with a weight (delay time) of zero. For the average EDT of the device, we begin each walk at a random point at the surface of the gate where it faces the channel region. Within the resistive (gate) material, the random walk is the same as for voltage calculation and can be done using tools such as QuickCap and Rapid3D. At the surface (facing a channel), the source term effectively increases the value (EDT) of the random walk. The walk continues until it hits the driver (a source or via), at which time the value is the accumulated EDT.

Averaging many walks gives the EDT (average delay if beginning each walk at a random point on the device surface). By selecting a CperArea value that is 1/device-Area, the total capacitance is one so that the result is the resistance that is required to give the correct EDT.

A slight variation can account for the location of a parasitic-capacitance node within the RC network. In the 3D case, we treat the "free" surface (not facing a via or device) as a separate device.

For stacked gates (e.g., CFET), an enhancement to this approach is useful. In the cross-section shown in FIG. 6, the top and bottom devices are distributed (not ideal voltages). The inter-device resistance is not defined by any classical resistance approach, and no other R-solution presents itself with any confidence. The average EDT on either channel, due to its own capacitance, gives the P2P resistance to the driver. The average EDT on either channel, due to the capacitance of the other device, gives the resistance of the common resistor shown in FIG. 6 as the Y resistor network 602.

Electronic Design Automation

Figure 1:
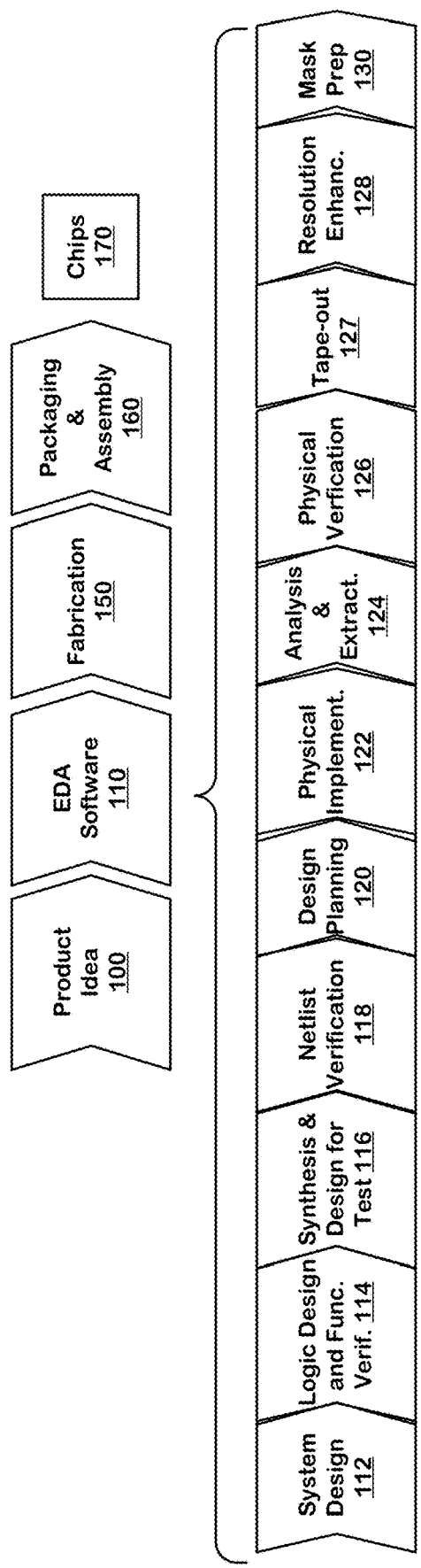
FIG. 1 illustrates EDA tools and process flow for integrated circuit design and manufacturing.

Aspects of the technology disclosed can be used to support an integrated circuit design flow. FIG. 1 shows a simplified representation of an illustrative digital integrated circuit design flow. At a high level, the process starts with the product idea (step 100) and is realized in an EDA (Electronic Design Automation) software design process (step 110). When the design is finalized, it can be taped-out (step 127). At some point after tape out, the fabrication process (step 150) and packaging and assembly processes (step 160) occur resulting, ultimately, in finished integrated circuit chips (result 170).

The EDA software design process (step 110) is itself composed of a number of steps 112-130, shown in linear fashion for simplicity. In an actual integrated circuit design process, the particular design might have to go back through steps until certain tests are passed. Similarly, in any actual design process, these steps may occur in different orders and combinations. This description is therefore provided by way of context and general explanation rather than as a specific, or recommended, design flow for a particular integrated circuit.

A brief description of the component steps of the EDA software design process (step 110) will now be provided.

System design (step 112): The designers describe the functionality that they want to implement, they can perform what-if planning to refine functionality, check costs, etc. Hardware-software architecture partitioning can occur at this stage. Example EDA software products from Synopsys, Inc. that can be used at this step include Model Architect, System Studio, and DesignWare® products.

Logic design and functional verification (step 114): At this stage, the VHDL or Verilog code for modules in the system is written, and the design is checked for functional accuracy. More specifically, the design is checked to ensure that it produces correct outputs in response to particular input stimuli. Example EDA software products from Synopsys, Inc. that can be used at this step include VCS, VERA, DesignWare®, Magellan, Formality, ESP and LEDA products.

Synthesis and design for test (step 116): Here, the VHDL/Verilog is translated to a netlist. The netlist can be optimized for the target technology. Additionally, the design and implementation of tests to permit checking of the finished chip occurs. Example EDA software products from Synopsys, Inc. that can be used at this step include Design Compiler®, Physical Compiler, DFT Compiler, Power Compiler, FPGA Compiler, TetraMAX, and DesignWare® products.

Netlist verification (step 118): At this step, the netlist is checked for compliance with timing constraints and for correspondence with the VHDL/Verilog source code. Example EDA software products from Synopsys, Inc. that can be used at this step include Formality, PrimeTime, and VCS products.

Design planning (step 120): Here, an overall floor plan for the chip is constructed and analyzed for timing and top-level routing. Example EDA software products from Synopsys, Inc. that can be used at this step include Astro and Custom Designer products.

Physical implementation (step 122): The placement (positioning of circuit elements) and routing (connection of the same) occurs at this step, as can selection of library cells to perform specified logic functions. Example EDA software products from Synopsys, Inc. that can be used at this step include the Astro, IC Compiler, and Custom Designer products.

Analysis and extraction (step 124): At this step, the circuit function is verified at a transistor level, this, in turn, permits what-if refinement. Example EDA software products from Synopsys, Inc. that can be used at this step include Astro-Rail, PrimeRail, PrimeTime, and Star-RCXT products.

Physical verification (step 126): At this step, various checking functions are performed to ensure correctness for manufacturing, electrical issues, lithographic issues, and circuitry. Example EDA software products from Synopsys, Inc. that can be used at this step include the Hercules product.

Tape-out (step 127): This step provides the "tape out" data to be used (after lithographic enhancements are applied if appropriate) for production of masks for lithographic use to produce finished chips. Example EDA software products from Synopsys, Inc. that can be used at this step include the IC Compiler and Custom Designer families of products.

Resolution enhancement (step 128): This step involves geometric manipulations of the layout to improve manufacturability of the design. Example EDA software products from Synopsys, Inc. that can be used at this step include Proteus, ProteusAF, and PSMGen products.

Mask data preparation (step 130): This step provides mask-making-ready "tape-out" data for production of masks for lithographic use to produce finished chips. Example EDA software products from Synopsys, Inc. that can be used at this step include the CATS® family of products. The method for actually making the masks can use any mask making technique, either known today or developed in the future. As an example, masks can be printed using techniques set forth in U.S. Pat. Nos. 6,096,458; 6,057,063; 5,246,800; 5,472,814; and 5,702,847, all incorporated by referenced herein for their teachings of mask printing techniques.

Once the process flow is ready, it can be used for manufacturing multiple circuit designs coming from various designers in various companies. The EDA flow 112-130 will be used by such designers. A combination of the process flow and the masks made from step 130 are used to manufacture any particular circuit.

A Design Technology Co-Optimization (DTCO) process flow provides a simulation flow that enables technology development and design teams to evaluate various transistors, interconnects and process options using a design and technology co-optimization methodology that starts in the pre-wafer research phase. Using techniques described herein, the DTCO process flow may take into account parasitic interconnect resistance of various conductors or interconnects in an IC. The DTCO process flow can be used to evaluate the performance, power, area, and cost of a new or significantly modified IC fabrication technology, including interconnect fabrication technology. Achieving transistor performance and power targets of new IC technology requires consideration of new material options for interconnects, and sometimes also new interconnect mapping in the IC. Parasitic resistances of interconnects are taken into account during the performance evaluation of the new technology.

Resistance Modeling Based on Elmore Delay Time (EDT)

Figure 2:
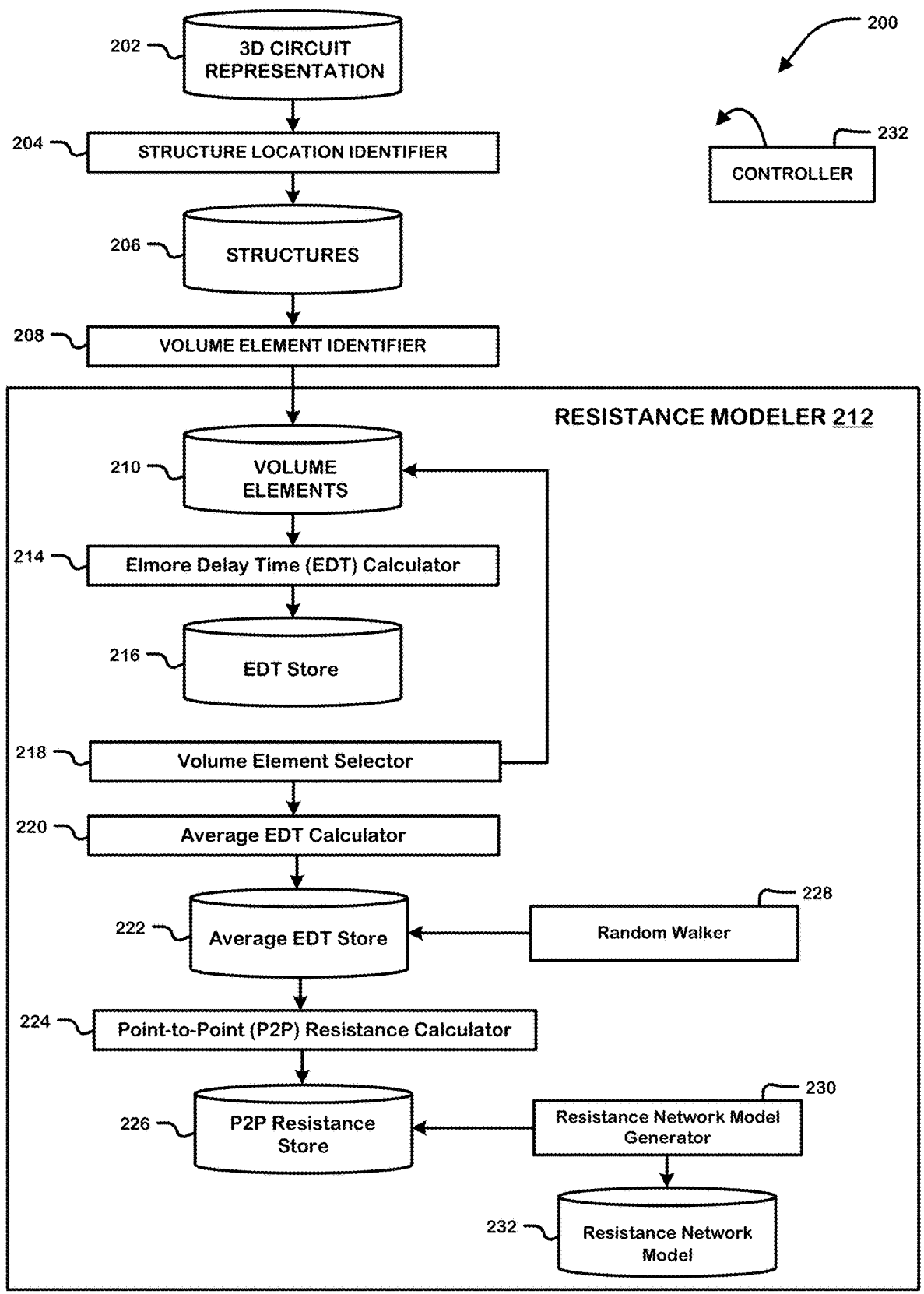
FIG. 2 illustrates a flowchart detail of a structure simulation system 200 that can model resistance of a structure based on Elmore Delay Time (EDT).

FIG. 2 illustrates a flowchart detail of a structure simulation system 200 that can model resistance of a structure based on Elmore Delay Time (EDT). The structure simulation system 200 starts with a 3D circuit representation in database 202. As used herein, no distinction is intended between whether a database is disposed "on" or "in" a computer readable medium. Additionally, as used herein, the term "database" does not necessarily imply any unity of structure. For example, two or more separate databases, when considered together, still constitute a "database" as that term is used herein. Thus in FIG. 2, the databases 202 can be a single combination database, or a combination of two or more separate databases. The databases 202 can be stored on a hard drive, a storage device or in a memory location or in one or more non-transitory computer readable media.

The 3D circuit representation 202 represents a circuit design. The 3D circuit representation 202 indicates the surfaces and interfaces among different components and materials in the circuit design, and takes account of line edge variation and corner rounding from photolithographic patterning and etching. The circuit design may include any combination of electronic devices, pins and interconnects. Electronic devices are components for controlling the flow of electrical currents for the purpose of information processing, information storage, and system control. Examples of electronic devices include transistors, diodes, capacitors, and tunnel junctions. Electronic devices are connected to the circuit through their terminals, e.g., the gate, source, and drain of a transistor. Pins in the circuit design pass signals from and to other circuit designs and power supply lines. Transistors and pins in a circuit design are connected through metallic conductors referred to herein as interconnects, where the transistor terminals and pins act as the endpoints of interconnects.

The 3D circuit representation 202 includes at least one structure. As used herein, "structure" can be a gate terminal, a source terminal, a drain terminal, a channel region, and a vias. A structure comprises a core material. The core material is the innermost material of the structure. In some embodiments, the core material can be the entire structure. In some embodiments, the core material can be sheathed by a second material. If the second material is a conductor, it is considered herein to be a part of the same "structure" or interconnect as the core material.

FIG. 3 shows an example planar MOSFET transistor. The technology disclosed can be used model resistance of a gate terminal, a source terminal, and a drain terminal of the planar MOSFET transistor. The three resistors indicate one representation of an Rg/3 model.

Figure 4:
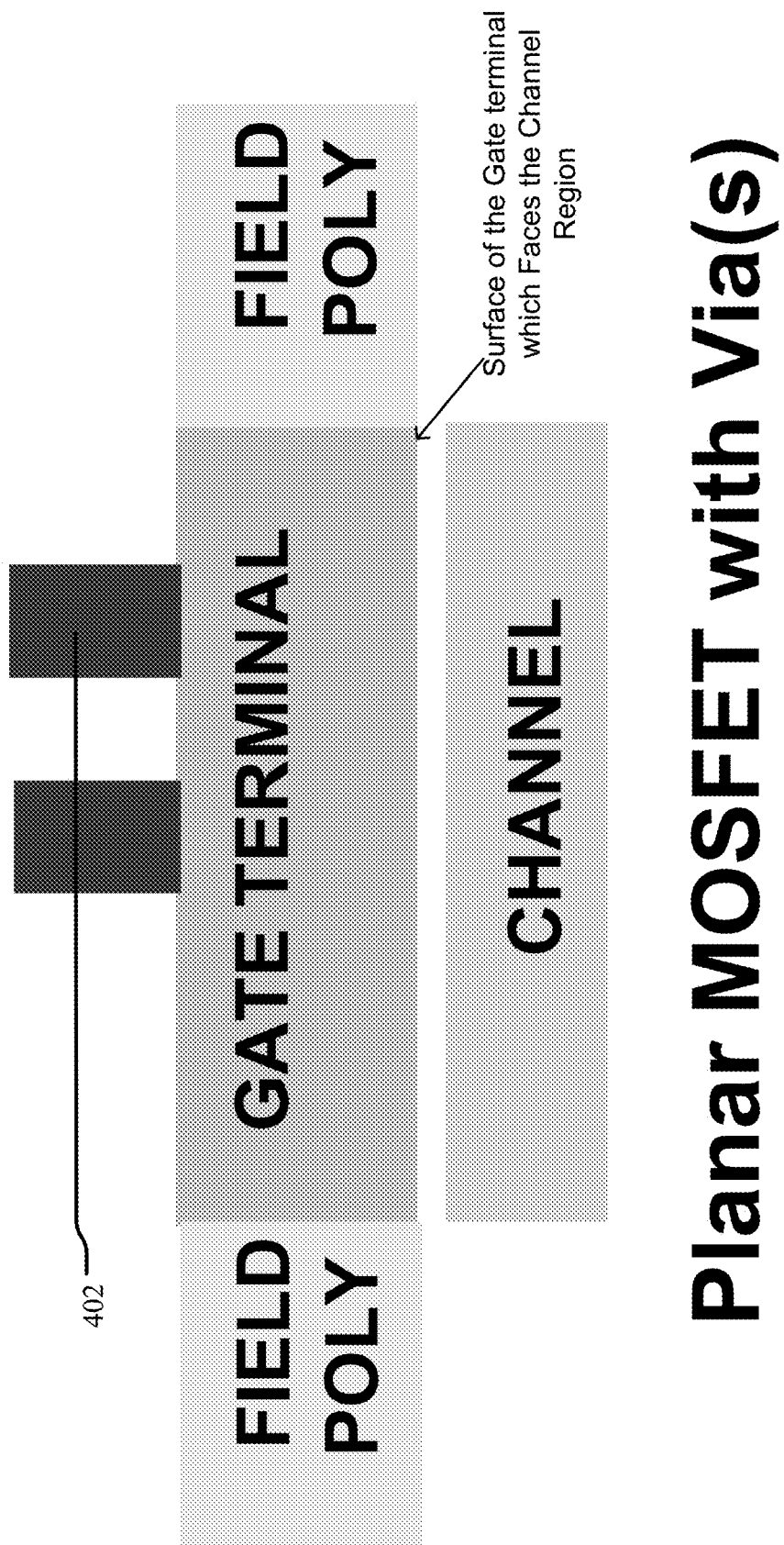
FIG. 4 shows an example planar MOSFET transistor with vias. The technology disclosed can be used to model resistance including effect of vias on the planar MOSGET transistor.

FIG. 4 shows an example planar MOSFET transistor with vias 402. The technology disclosed can be used to model resistance including effect of vias on the planar MOSGET transistor.

Figure 5A:
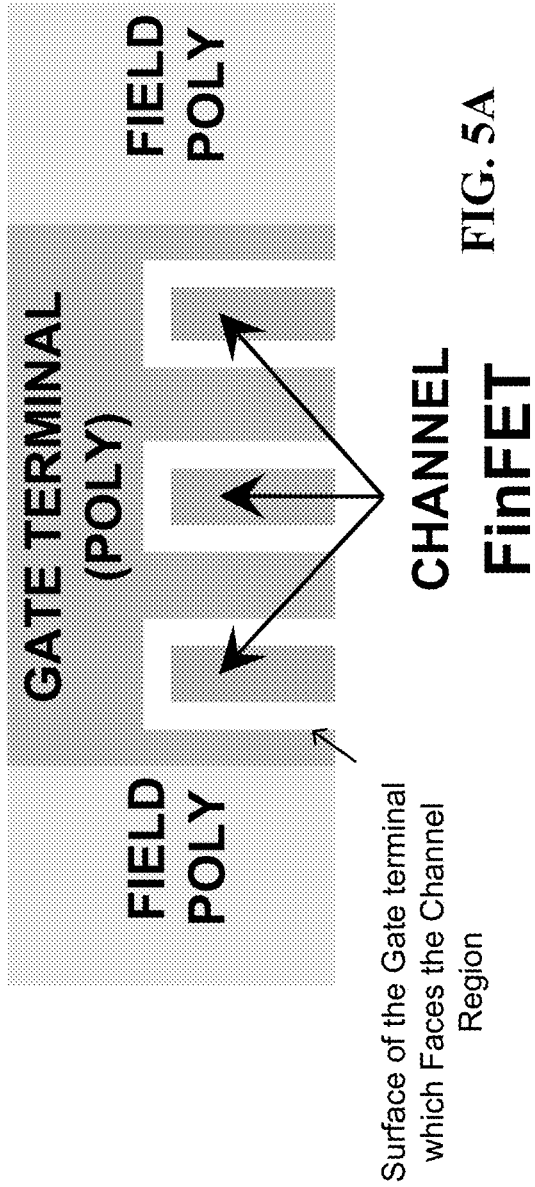
FIG. 5A shows an example FinFet transistor. The technology disclosed can be used model resistance of a gate terminal, a source terminal, a drain terminal, and a via of the FinFet transistor.

FIG. 5A shows an example FinFet transistor. The technology disclosed can be used model resistance of a gate terminal, a source terminal, a drain terminal, and a via of the FinFet transistor.

Figure 5B:
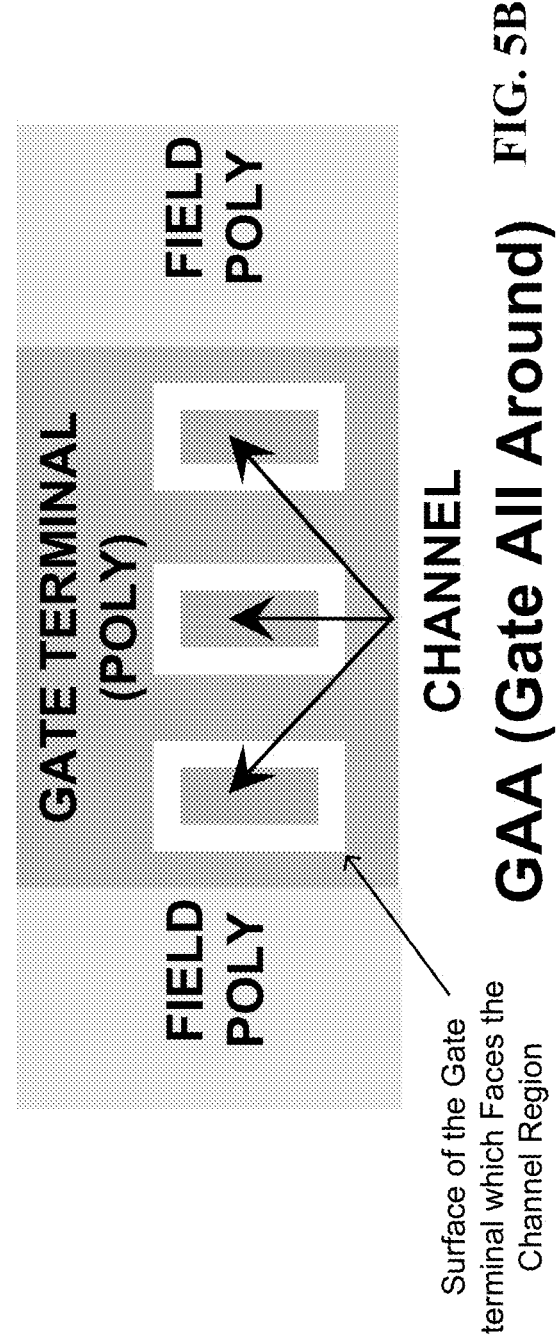
FIG. 5B shows an example GAA (Gate All Around) transistor. The technology disclosed can be used model resistance of a gate terminal, a source terminal, a drain terminal, and a via of the GAA transistor.

FIG. 5B shows an example GAA (Gate All Around) transistor. The technology disclosed can be used model resistance of a gate terminal, a source terminal, a drain terminal, and a via of the GAA transistor.

Figure 6:
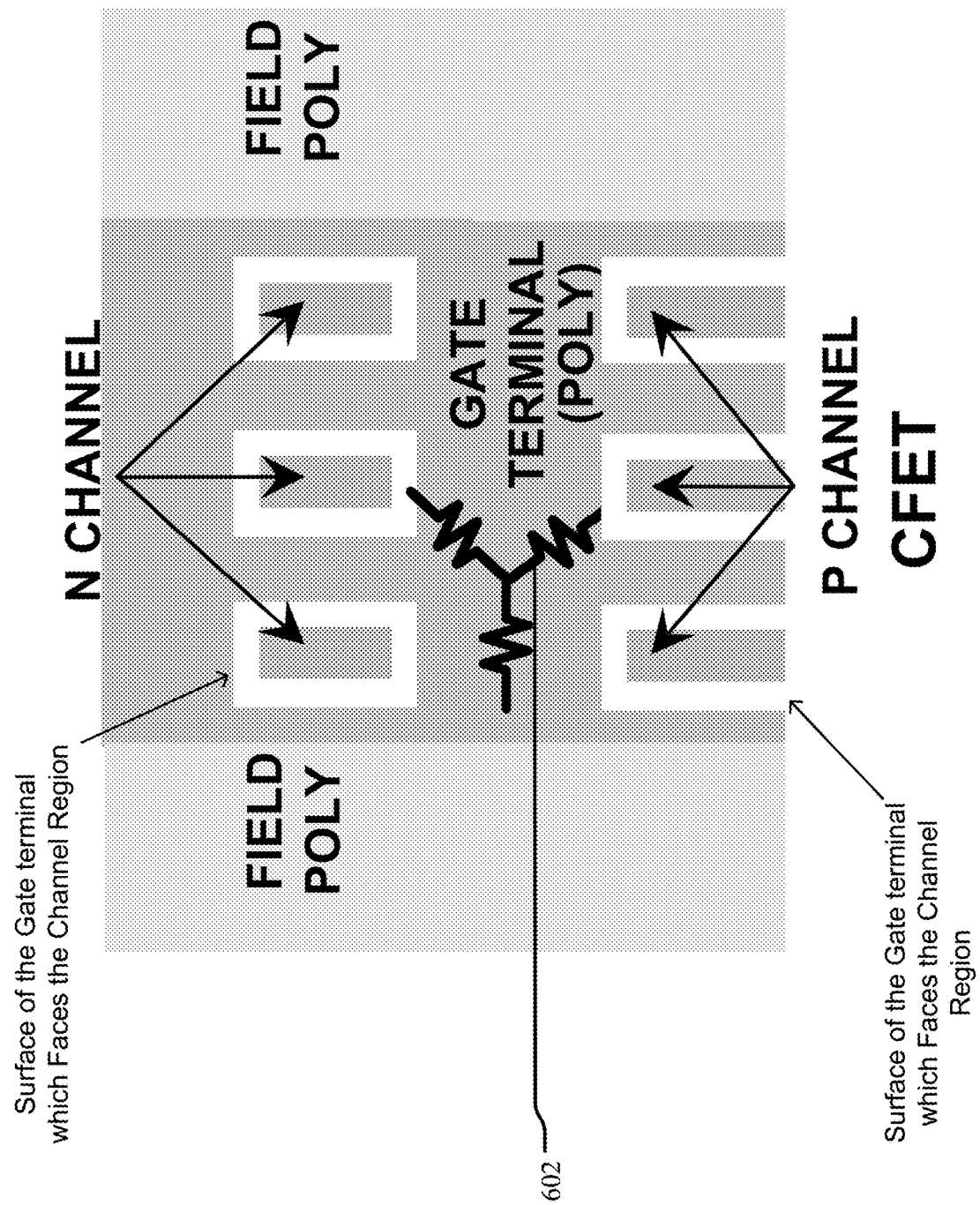
FIG. 6 shows an example CFET transistor. The technology disclosed can be used model resistance of one or more gate terminals, source terminals, drain terminals, and vias of the CFET transistor.

FIG. 6 shows an example CFET transistor. The technology disclosed can be used model resistance of one or more gate terminals, source terminals, drain terminals, and vias of the CFET transistor.

Referring to FIG. 2 again, the structure location identifier 204 identifies various structures in the 3-D circuit representation 202. In the 3-D circuit representation 202, at least one structure is identified from the plurality of structures, such as gate terminals, source terminals, drain terminals, and vias. A structure of the gate terminal/source terminal/drain terminal/vias is specified in a data structure 206 in the memory using a three-dimensional (3D) coordinate system. In some embodiments, the structure location identifier 204 may identify a part of a structure. The structure location identifier 204 outputs the identified structures to a structure database 208.

A resistance modeler 212 models resistance of a structure (i.e., gate terminal/source terminal/drain terminal/vias) of the transistor. The transistor has at least one channel region.

Referring to FIG. 2, identified structures in database 206, such as the gate terminal/source terminal/drain terminal/vias, are provided to a volume element identifier 208. The volume element identifier 208 may also receive any parameters to be used in generating volume elements in a structure. The volume element identifier 208 creates a grid of volume elements in the structure to be modeled. A volume element data structure is populated for each volume element, which includes an indication of the position of the grid volume element in the structure (in three dimensions), and values for various properties of the structure at that volume element. In some embodiments, the volume elements may be cross-section volumes of the structure. It will be evident to a person skilled in the art that various modifications of the shape of the volume element may be made within the scope of the invention. In some embodiments, volume elements in a structure can be of arbitrary shapes. However, the volume elements are longitudinally adjacent to each other as to form a continuous longitudinal conducting path spanning the two surfaces of the structure across which the resistance is to be estimated.

The volume element identifier 208 outputs a grid of volume elements 210. The grid of volume elements 210 is provided to the resistance modeler 212.

The resistance modeler 212 in turn comprises an Elmore delay time (EDT) calculator 214, an EDT store 216, volume element selector 218, average EDT calculator 220, average EDT store 222, a point-to-point resistance calculator 224, a point-to-point resistance store 226, a random walker 228, and a resistance network model generator 230.

For each of a plurality of volume elements 210 in the specified structure, an Elmore delay time (EDT) is determined by an EDT calculator 214 and stored in a database 216 in the memory. In one embodiment, the EDT is determined by solving a Laplace's equation with a Neumann boundary condition. The Laplace's equation is of a form $t_{ELMORE} = G^{-1} * C_{TOT}$, where $t_{ELMORE}$ is a vector of the EDT of each of the plurality of volume elements 210, G is a conductance matrix, and $C_{TOT}$ is a vector of total capacitance at each of the plurality of volume elements 210. The Neumann boundary condition is constant for the volume elements in the plurality of volume elements 210 that are located on the surface of the gate terminal/source terminal/drain terminal/vias which faces the channel region.

For those volume elements in the plurality of volume elements that are located on a surface of the gate terminal which faces the channel region (as determined by the volume element selector 218), an average EDT (aEDT) 222 is determined based on the EDT 216 and stored in the database 222 in the memory.

A point-to-point (P2P) resistance calculator 224 generates point-to-point resistance values 226 of the gate terminal/source terminal/drain terminal/vias as a function of the aEDT 222 and a capacitance of the gate terminal/source terminal/drain terminal/vias. In one embodiment, the point-to-point resistance values 226 of the gate terminal/source terminal/drain terminal/vias are generated as a function of dividing the aEDT 222 by the capacitance of the gate terminal/source terminal/drain terminal/vias.

In one embodiment, point-to-point resistance values of a parasitic-capacitance node of the gate terminal are generated by the point-to-point (P2P) resistance calculator 224 by (i) determining an average EDT (aEDT) based on the EDT for those volume elements in the plurality of volume elements 218 that are located on a surface of the gate terminal/source terminal/drain terminal/vias which does not face the channel region (as determined by the volume element selector 218) and (ii) executing a program of instructions to generate the point-to-point resistance values 226 of the parasitic-capacitance node of the gate terminal/source terminal/drain terminal/vias as a function of the aEDT and a capacitance of the gate terminal/source terminal/drain terminal/vias.

In one embodiment, the point-to-point resistance values 226 of the parasitic-capacitance node of the gate terminal/source terminal/drain terminal/vias are generated as a function of dividing the aEDT by the capacitance of the gate terminal/source terminal/drain terminal/vias.

In some embodiments, the aEDT 222 is directly determined using a random walker 228 without determining the EDT.

In one embodiment, a resistor network model 232 for the transistor is computed by a resistor network model generator 230 based on the point-to-point resistance values 226 of the gate terminal, the source terminal, and the drain terminal. In one embodiment, the resistor network model 232 is utilized for parasitic extraction and timing verification in electronic design of an integrated circuit.

In one embodiment, the transistor is a metal-oxide-semiconductor field-effect transistor (MOSFET). In another embodiment, the transistor is a fin field effect transistor (FinFet). In yet another embodiment, the transistor is a gate all-around (GAA) transistor.

In one embodiment, the transistor is a complementary field effect transistor (CFET) having at least a first gate terminal and a second gate terminal. Resistance of the first and second gate terminals is modeled by (i) specifying a first structure of the first gate terminal in the data structure in the memory using the 3D coordinate system and specifying a second structure of the second gate terminal in the data structure in the memory using the 3D coordinate system, (ii) for each of a first plurality of volume elements in the specified first structure, determining a first Elmore delay time (EDT) and storing the first EDT in the database in the memory, and for each of a second plurality of volume elements in the specified second structure, determining a second EDT and storing the second EDT in the database in the memory, (iii) for those volume elements in the first and second pluralities of volume elements that are located on respective surfaces of the first and second gate terminals which face respective channel regions of the first and second gate terminals, determining an average EDT (aEDT) based on the EDT and storing the aEDT in the database in the memory, and (iv) executing a program of instructions to generate point-to-point resistance values of the gate terminal as a function of the aEDT and a capacitance of the gate terminal.

The resistance network model 232 may be provided to a user by a reporting module. In one embodiment the resistance network model 232 is written to a non-transitory computer readable medium such as a disk drive, a storage device or computer memory, and in a further embodiment the resistance network model 232 can be provided to a visualization module which presents the distribution of the resistances across the conducting structures in the 3D circuit representation 202 in a visual form which simplifies user interpretation of the results.

The resistance network model 232 is then used, in various embodiments, for a variety of real-world aspects of building or improving integrated circuit devices. In one embodiment, for example, the results are used to develop or improve a fabrication process flow for conductors in an IC. In another embodiment, the resistance network model 232 is used to characterize or improve gate terminal, source terminal, drain terminal, interconnects, vias, contact pads and nanowires. In other embodiments, the results are used to develop HSPICE models of the integrated circuit devices, in order to enable designers to develop better circuit designs and layouts. In yet other embodiments the results are used to improve process flow to achieve the desired transistor and capacitor performance. Thus, the resistance network model 232 obtained by the methods and systems described herein are used for real-world technological development or implementation of semiconductor manufacturing processes or circuit designs.

Referring to FIG. 2, the sequence of operation of the structure location identifier 204, the volume element identifier 208, and the resistance modeler 212 can be controlled automatically by a flow controller 232. Flow controller 232 may be a module that executes scripts to call each of the individual processing modules in the sequence set forth in FIG. 2, and defines the data flow among them. Flow controller 232 may be implemented, for example, with Sentaurus Workbench, available from Synopsys, Inc.

Computer System

Figure 9:
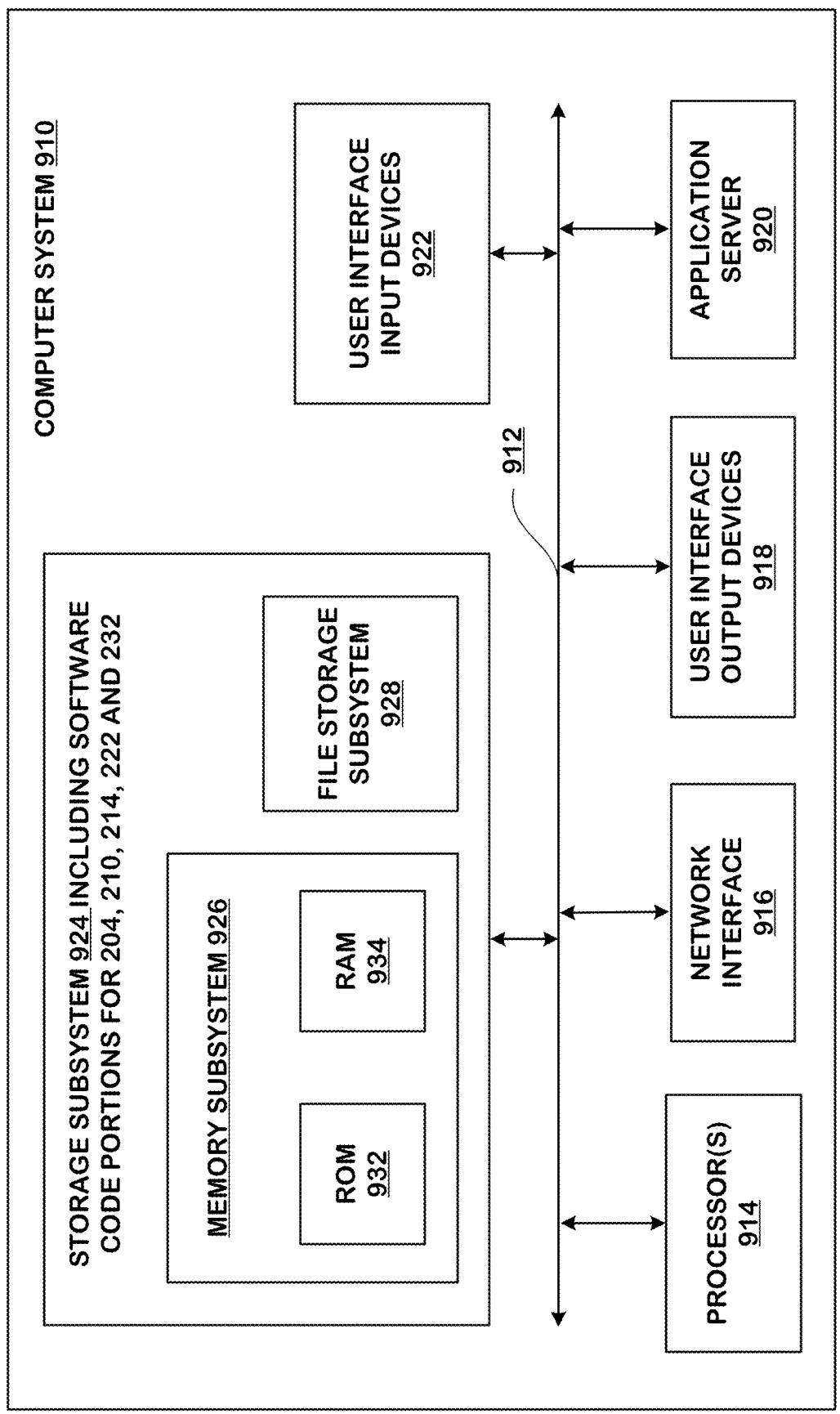
FIG. 9 is a simplified block diagram of a computer system that incorporates aspects of the invention.

FIG. 9 is a simplified block diagram of a computer system 910 that can be used to implement any of the methods herein. Particularly it can be used to implement modules 204, 210, 214, 216, 222, and/or 232 in various embodiments. It also includes or accesses the databases 202, 208, 212, 216, 218, and/or 222.

Computer system 910 typically includes a processor subsystem 914 which communicates with a number of peripheral devices via bus subsystem 912. These peripheral devices may include a storage subsystem 924, comprising a memory subsystem 926 and a file storage subsystem 928, user interface input devices 922, user interface output devices 920, and a network interface subsystem 916. The input and output devices allow user interaction with computer system 910. Network interface subsystem 916 provides an interface to outside networks, including an interface to the communication network 918, and is coupled via communication network 918 to corresponding interface devices in other computer systems. Communication network 918 may comprise many interconnected computer systems and communication links. These communication links may be wireline links, optical links, wireless links, or any other mechanisms for communication of information, but typically it is an IP-based communication network. While in one embodiment, communication network 918 is the Internet, in other embodiments, communication network 918 may be any suitable computer network.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 922 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into computer system 910 or onto computer network 918.

User interface output devices 920 may include a display subsystem, a printer, a fax machine, or non-visual displays such as audio output devices. The display subsystem may include a cathode ray tube (CRT), a flat panel device such as a liquid crystal display (LCD), a projection device, or some other mechanism for creating a visible image. The display subsystem may also provide a nonvisual display such as via audio output devices. In general, use of the term "output device" is intended to include all possible types of devices and ways to output information from computer system 910 to the user or to another machine or computer system.

Storage subsystem 924 stores the basic programming and data constructs that provide the functionality of certain embodiments of the present invention. For example, the various modules implementing the functionality of certain embodiments of the invention may be stored in storage subsystem 924. These software modules are generally executed by processor subsystem 914. The databases 202, 208, 212, 216, 218, and/or 222 may reside in storage subsystem 924.

Memory subsystem 926 typically includes a number of memories including a main random access memory (RAM) 934 for storage of instructions and data during program execution and a read-only memory (ROM) 932 in which fixed instructions are stored. File storage subsystem 928 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystem 928. The host memory 926 contains, among other things, computer instructions which, when executed by the processor subsystem 914, cause the computer system to operate or perform functions as described herein. As used herein, processes and software that are said to run in or on "the host" or "the computer," execute on the processor subsystem 914 in response to computer instructions and data in the host memory subsystem 926 including any other local or remote storage for such instructions and data.

Bus subsystem 912 provides a mechanism for letting the various components and subsystems of computer system 910 communicate with each other as intended. Although bus subsystem 912 is shown schematically as a single bus, alternative embodiments of the bus subsystem may use multiple busses.

Computer system 910 itself can be of varying types including a personal computer, a portable computer, a workstation, a computer terminal, a network computer, a television, a mainframe, a server farm, or any other data processing system or user device. Due to the ever-changing nature of computers and networks, the description of computer system 910 depicted in FIG. 9 is intended only as a specific example for purposes of illustrating the preferred embodiments of the present invention. Many other configurations of computer system 910 are possible having more or less components than the computer system depicted in FIG. 9.

In addition, while the present invention has been described in the context of a fully functioning data processing system, those of ordinary skill in the art will appreciate that the processes herein are capable of being distributed in the form of a computer readable medium of instructions and data and that the invention applies equally regardless of the particular type of signal bearing media actually used to carry out the distribution. As used herein, a computer readable medium is one on which information can be stored and read by a computer system. Examples include a floppy disk, a hard disk drive, a RAM, a CD, a DVD, flash memory, a USB drive, and so on. The computer readable medium may store information in coded formats that are decoded for actual use in a particular data processing system. A single computer readable medium, as the term is used herein, may also include more than one physical item, such as a plurality of CD ROMs or a plurality of segments of RAM, or a combination of several different kinds of media. As used herein, the term does not include mere time-varying signals in which the information is encoded in the way the signal varies over time.

Various terminology is utilized herein, and should be interpreted according to its conventional meaning in the relevant arts, unless otherwise defined below:

As used herein, a given value is "responsive" to a predecessor value if the predecessor value influenced the given value. If there is an intervening processing element, step or time period, the given value can still be "responsive" to the predecessor value. If the intervening processing element or step combines more than one value, the signal output of the processing element or step is considered "responsive" to each of the value inputs. If the given value is the same as the predecessor value, this is merely a degenerate case in which the given value is still considered to be "responsive" to the predecessor value. "Dependency" of a given value upon another value is defined similarly.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "indicate" is used herein to mean the same as "identify".

"Computer model" in this context refers to the logic (e.g., algorithms and equations) that represent the behavior of the system being modeled. Computer simulation is the actual execution of logic comprising these equations or algorithms. Simulation, therefore, is the process of executing a model.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non-transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Programmable device" in this context refers to an integrated circuit designed to be configured and/or reconfigured after manufacturing. The term "programmable processor" is another name for a programmable device herein. Programmable devices may include programmable processors, such as field programmable gate arrays (FPGAs), configurable hardware logic (CHL), and/or any other type programmable devices. Configuration of the programmable device is generally specified using a computer code or data such as a hardware description language (HDL), such as for example Verilog, VHDL, or the like. A programmable device may include an array of programmable logic blocks and a hierarchy of reconfigurable interconnects that allow the programmable logic blocks to be coupled to each other according to the descriptions in the HDL code. Each of the programmable logic blocks may be configured to perform complex combinational functions, or merely simple logic gates, such as AND, and XOR logic blocks. In most FPGAs, logic blocks also include memory elements, which may be simple latches, flip-flops, hereinafter also referred to as "flops," or more complex blocks of memory. Depending on the length of the interconnections between different logic blocks, signals may arrive at input terminals of the logic blocks at different times.

"Selector" in this context refers to a logic element that selects one of two or more inputs to its output as determined by one or more selection controls. Examples of hardware selectors are multiplexers and demultiplexers. An example software or firmware selector is: if (selection_control==true) output=input1; else output=input2; Many other examples of selectors will be evident to those of skill in the art, without undo experimentation.

"Software" in this context refers to logic implemented as processor-executable instructions in a machine memory (e.g. read/write volatile or nonvolatile memory or media which can be non-transitory).

"Switch" in this context refers to logic to select one or more inputs to one or more outputs under control of one or more selection signals. Examples of hardware switches are mechanical electrical switches for switching power to circuits, devices (e.g., lighting), or motors. Other examples of hardware switches are solid-state switches such as transistors. An example of a hardware or firmware switch is: if (selection==true) output=input; else output=0; A somewhat more complicated software/firmware switch is: if (selection1==true and selection2==true) output=input1; else if (selection1==true and selection2==false) output=input2; else if (selection1==false and selection2==true) output=input3; else output=noOp; Switches operate similarly to selectors in many ways (see the definition of Selector), except in some cases switches may select all inputs to the output(s) not select among inputs. Other examples of switches will be readily apparent to those having skill in the art, without undo experimentation.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Macrocell Implementations

A circuit or layout that includes a nano-scale structure as described herein can be designed in advance and provided to designers as a macrocell (which as used herein can be a standard cell). It is common for integrated circuit designers to take advantage of macrocells that have been pre-designed for particular kinds of circuits, such as logic gates, larger logic functions, memory (including SRAM) and even entire processors or systems. These macrocells are provided in a library available from various sources, such as foundries, ASIC companies, semiconductor companies, third party IP providers, and even EDA companies, and used by designers when designing larger circuits. Each macrocell typically includes such information as a graphical symbol for schematic drawings; text for a hardware description language such as Verilog; a netlist describing the devices in the included circuit, the interconnections among them, and the input and output nodes; a layout (physical representation) of the circuit in one or more geometry description languages such as GDSII; an abstract of the included geometries for use by place-and-route systems; a design rule check deck; simulation models for use by logic simulators and circuit simulators; and so on. Some libraries may include less information for each macrocell, and others may include more. In some libraries the entries are provided in separate files, whereas in others they are combined into a single file, or one file containing the entries for multiple different macrocells. In all cases the files are either stored and distributed on a computer readable medium, or delivered electronically and stored by the user on a computer readable medium. Macrocell libraries often contain multiple versions of the same logic function differing in area, speed and/or power consumption, in order to allow designers or automated tools the option to trade off among these characteristics. A macrocell library can also be thought of as a database of macrocells. As used herein, the term "database" does not necessarily imply any unity of structure. For example, two or more separate databases, when considered together, still constitute a "database" as that term is used herein. As such, the entries defining each single macrocell can also be thought of as a "database". It can be seen that aspects of the invention also may be present in macrocells and macrocell libraries.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present invention may consist of any such feature or combination of features. In view of the foregoing description, it will be evident to a person skilled in the art that various modifications may be made within the scope of the invention.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. In particular, and without limitation, any and all variations described, suggested or incorporated by reference in the background section of this patent application are specifically incorporated by reference into the description herein of embodiments of the invention. In addition, any and all variations described, suggested or incorporated by reference herein with respect to any one embodiment are also to be considered taught with respect to all other embodiments. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A computer-implemented method executed by an integrated circuit design tool for modeling resistance of a gate terminal of a transistor for implementation on an integrated circuit, the transistor having at least one channel region, the method including:
   specifying a structure of the gate terminal in a data structure in memory using a three-dimensional (3D) coordinate system;
   for each of a plurality of volume elements in the specified structure, determining an Elmore delay time (EDT) and storing the EDT in a database in the memory;
   for those volume elements in the plurality of volume elements that are located on a surface of the gate terminal which faces the channel region, determining an average EDT (aEDT) based on the EDT and storing the aEDT in the database in the memory; and
   executing a program of instructions to generate point-to-point resistance values of the gate terminal as a function of the aEDT and a capacitance of the gate terminal.

2. The computer-implemented method of claim 1, wherein the point-to-point resistance values of the gate terminal are generated as a function of dividing the aEDT by the capacitance of the gate terminal.

3. The computer-implemented method of claim 1, wherein the EDT is determined by solving a Laplace's equation with a Neumann boundary condition.

4. The computer-implemented method of claim 3, wherein the Laplace's equation is of a form:

$$tELMORE = G-1 * CTOT,$$

where
tELMORE is a vector of the EDT of each of the plurality of volume elements,
G is a conductance matrix, and
CTOT is a vector of total capacitance at each of the plurality of volume elements.

5. The computer-implemented method of claim 3, wherein the Neumann boundary condition is constant for the volume elements in the plurality of volume elements that are located on the surface of the gate terminal which faces the channel region.

6. The computer-implemented method of claim 1, further including generating point-to-point resistance values of a parasitic-capacitance node of the gate terminal by:
   determining an average EDT (aEDT) based on the EDT for those volume elements in the plurality of volume elements that are located on a surface of the gate terminal which does not face the channel region; and
   executing a program of instructions to generate the point-to-point resistance values of the parasitic-capacitance node of the gate terminal as a function of the aEDT and a capacitance of the gate terminal.

7. The computer-implemented method of claim 6, wherein the point-to-point resistance values of the parasitic-capacitance node of the gate terminal are generated as a function of dividing the aEDT by the capacitance of the gate terminal.

8. The computer-implemented method of claim 1, wherein the transistor has at least one source terminal, further including modeling resistance of the source terminal of the transistor by:
   specifying a structure of the source terminal in a data structure in the memory using the 3D coordinate system;
   for each of a plurality of volume elements in the specified structure, determining an Elmore delay time (EDT) and storing the EDT in the database in the memory;
   for those volume elements in the plurality of volume elements that are located on a surface of the source terminal which faces the channel region, determining an average EDT (aEDT) based on the EDT and storing the aEDT in the database in the memory; and
   executing a program of instructions to generate point-to-point resistance values of the source terminal as a function of the aEDT and a capacitance of the source terminal.

9. The computer-implemented method of claim 8, wherein the point-to-point resistance values of the source terminal are generated as a function of dividing the aEDT by the capacitance of the source terminal.

10. The computer-implemented method of claim 1, wherein the transistor has at least one drain terminal, further including modeling resistance of the drain terminal of the transistor by:
    specifying a structure of the drain terminal in a data structure in the memory using the 3D coordinate system;
    for each of a plurality of volume elements in the specified structure, determining an Elmore delay time (EDT) and storing the EDT in the database in the memory;
    for those volume elements in the plurality of volume elements that are located on a surface of the drain terminal which faces the channel region, determining an average EDT (aEDT) based on the EDT and storing the aEDT in the database in the memory; and
    executing a program of instructions to generate point-to-point resistance values of the drain terminal as a function of the aEDT and a capacitance of the drain terminal.

11. The computer-implemented method of claim 10, wherein the point-to-point resistance values of the drain terminal are generated as a function of dividing the aEDT by the capacitance of the drain terminal.

12. The computer-implemented method of claim 1, further including directly determining the aEDT using a random walk approach without determining the EDT.

13. The computer-implemented method of claim 1, further including executing a program of instructions to compute a resistor network model for the transistor based on the point-to-point resistance values of the gate terminal, a source terminal, and a drain terminal.

14. The computer-implemented method of claim 13, further including utilizing the resistor network model for parasitic extraction and timing verification in electronic design of an integrated circuit.

15. The computer-implemented method of claim 1, wherein the transistor is a metal-oxide-semiconductor field-effect transistor (MOSFET).

16. The computer-implemented method of claim 1, wherein the transistor is a fin field effect transistor (FinFet).

17. The computer-implemented method of claim 1, wherein the transistor is a gate all-around (GAA) transistor.

18. The computer-implemented method of claim 1, wherein the transistor is a complementary field effect transistor (CFET) having at least a first gate terminal and a second gate terminal, further including:
    specifying a first structure of the first gate terminal in the data structure in the memory using the 3D coordinate system and specifying a second structure of the second gate terminal in the data structure in the memory using the 3D coordinate system;

for each of a first plurality of volume elements in the specified first structure, determining a first Elmore delay time (EDT) and storing the first EDT in the database in the memory, and for each of a second plurality of volume elements in the specified second structure, determining a second EDT and storing the second EDT in the database in the memory;

for those volume elements in the first and second pluralities of volume elements that are located on respective surfaces of the first and second gate terminals which face respective channel regions of the first and second gate terminals, determining an average EDT (aEDT) based on the EDT and storing the aEDT in the database in the memory; and executing a program of instructions to generate point-to-point resistance values of the gate terminal as a function of the aEDT and a capacitance of the gate terminal.

19. An integrated circuit design tool for modeling resistance of a gate terminal of a transistor, the transistor having at least one channel region, the tool comprising:

a computer system including a processor or processors and a memory, the memory storing instructions executable by the computer system for a process including:

specifying a structure of the gate terminal in a data structure in memory using a three-dimensional (3D) coordinate system;

for each of a plurality of volume elements in the specified structure, determining an Elmore delay time (EDT) and storing the EDT in a database in the memory;

for those volume elements in the plurality of volume elements that are located on a surface of the gate terminal which faces the channel region, determining an average EDT (aEDT) based on the EDT and storing the aEDT in the database in the memory; and executing a program of instructions to generate point-to-point resistance values of the gate terminal as a function of the aEDT and a capacitance of the gate terminal.

20. A computer program product comprising a non-transitory computer readable data storage medium storing a program of instructions to perform a method comprising:

specifying a structure of a gate terminal in a data structure in memory using a three-dimensional (3D) coordinate system;

for each of a plurality of volume elements in the specified structure, determining an Elmore delay time (EDT) and storing the EDT in a database in the memory;

for those volume elements in the plurality of volume elements that are located on a surface of the gate terminal which faces a channel region, determining an average EDT (aEDT) based on the EDT and storing the aEDT in the database in the memory; and executing a program of instructions to generate point-to-point resistance values of the gate terminal as a function of the aEDT and a capacitance of the gate terminal.

* * * * *